(12) United States Patent
Durrant et al.

(10) Patent No.: US 6,950,880 B1
(45) Date of Patent: Sep. 27, 2005

(54) SYSTEM AND METHOD FOR STANDARDIZING COMPONENT CHARACTERISTIC DATA SUBMITTED BY A SELLER FOR USE BY A BUYER

(75) Inventors: Douglas J. Durrant, Mission Viejo, CA (US); Gerald L. Hill, Huntington Beach, CA (US)

(73) Assignee: NCR Corporation, Dayton, OH (US)

( * ) Notice: Subject to any disclaimer, the term of this patent is extended or adjusted under 35 U.S.C. 154(b) by 764 days.

(21) Appl. No.: 09/652,722

(22) Filed: Aug. 31, 2000

(51) Int. Cl.$^7$ .............................................. G06F 15/16
(52) U.S. Cl. ...................... 709/246; 709/203; 709/217; 709/219
(58) Field of Search ............................ 707/103, 104.1; 705/26; 702/182; 700/121; 379/112.07; 709/201, 709/203, 217, 219, 246

(56) References Cited

U.S. PATENT DOCUMENTS

| | | | | |
|---|---|---|---|---|
| 5,333,183 A | * | 7/1994 | Herbert | ................. 379/112.07 |
| 5,625,816 A | * | 4/1997 | Burdick et al. | ......... 707/103 R |
| 5,832,502 A | * | 11/1998 | Durham et al. | .......... 707/104.1 |
| 5,889,674 A | * | 3/1999 | Burdick et al. | ............. 700/121 |
| 6,026,374 A | * | 2/2000 | Chess | .......................... 705/26 |
| 6,381,556 B1 | * | 4/2002 | Kazemi et al. | ............. 702/182 |

* cited by examiner

*Primary Examiner*—Rupal Dharia
*Assistant Examiner*—Quang N. Nguyen
(74) *Attorney, Agent, or Firm*—Lyon & Lyon, LLP

(57) ABSTRACT

A quality information system for receiving and/or presenting quality information in a component exchange system and methods of manufacturing and using the same. The quality information system comprises a receiving system, a converter, and an extractor. The receiving system is capable of receiving characteristic data from at least one seller processor and/or at least one buyer processor and is capable of communicating the characteristic data to the converter. Upon receiving the characteristic data, the converter converts the characteristic data into standardized characteristic data in accordance with a data standard established by the converter. The converter then communicates the standardized characteristic data to the extractor, which can present the standardized characteristic data to each of the seller processors and/or each of the buyer processors.

18 Claims, 7 Drawing Sheets

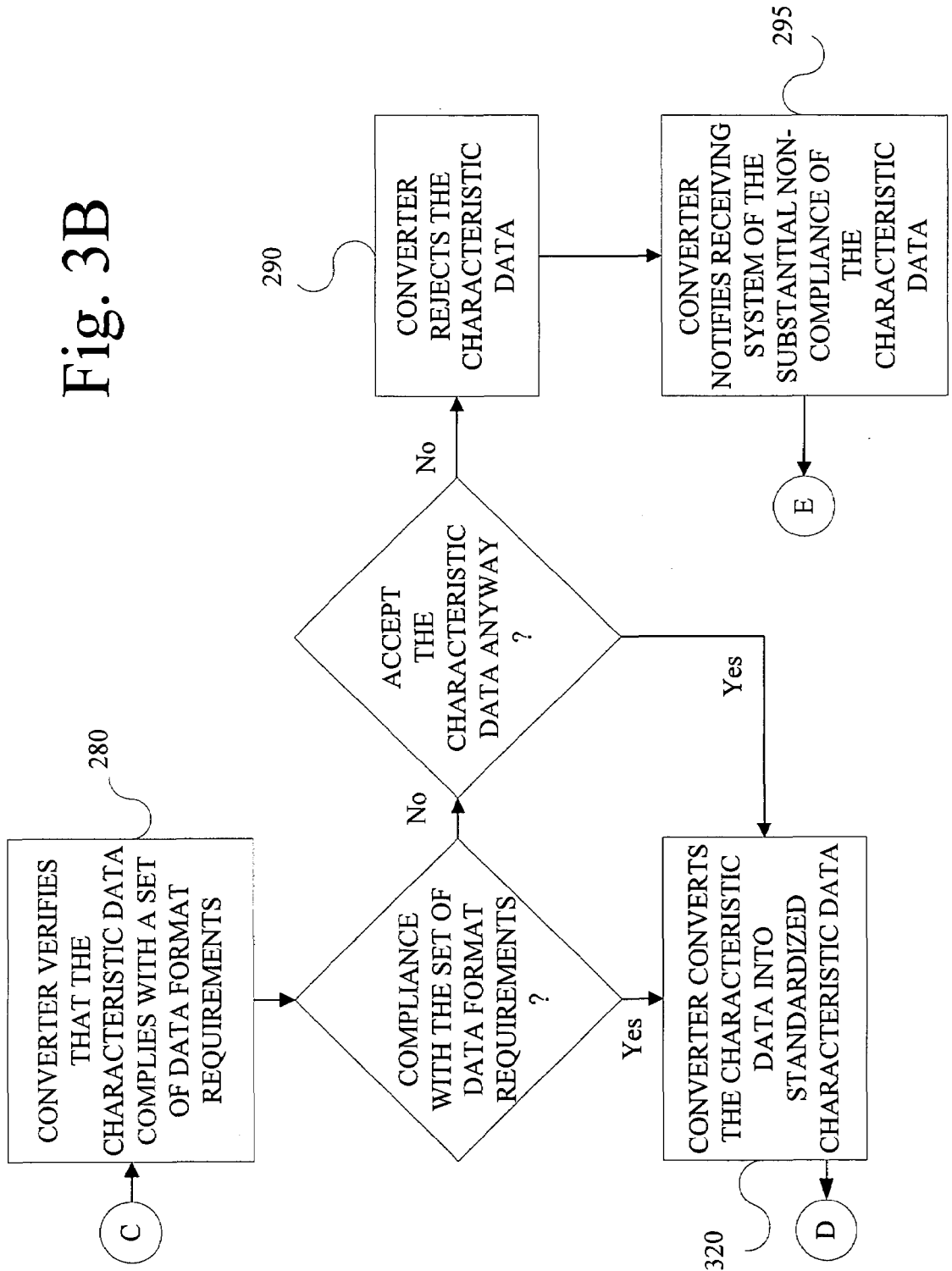

SYSTEM AND METHOD FOR STANDARDIZING COMPONENT CHARACTERISTIC DATA SUBMITTED BY A SELLER FOR USE BY A BUYER

BACKGROUND OF THE INVENTION

1. Field of the Invention

The present invention relates generally to information exchange systems and, more particularly, to a quality exchange system providing the capability to receive characteristic data, including quality information, standardize the characteristic data, and present the standardized characteristic data.

2. Description of the Prior Art and Related Information

Most commercial products are manufactured in volume by manufacturers who procure a variety of components from a variety of suppliers to assemble and sell an end product. Inevitably, a certain number of these end products will be returned to the manufacturer because they have reportedly failed in some way when a user attempted to use the product.

Historically, a significant percentage of these returned products are found to include no defects when subsequently evaluated by the manufacturer. Although no defects were found, many of these returned products may be scrapped, or re-tested and re-shipped, usually at a discount from the original selling price of the product. A manufacturer thus is subjected to losses from the testing of products that have no apparent defect and from the loss of revenue resulting from the scraping or discounting. Alternatively, a number of returned products actually might be defective, having failed due to one or more defective components that tend to fail according to a pattern of characteristic data. The pattern may not be obvious.

The return rate of a particular product, in some cases, may be influenced by the use of a particular component, either in isolation or in combination with other components purchased from one or more of the aforementioned variety of suppliers. To discover and characterize this influence, data warehousing and data mining techniques can be deployed if characteristic data for the components can be accessed.

Recently, Internet-based exchanges have been deployed to facilitate the purchase of components and products in a more efficient manner. In general, however, the purchase of components through these Internet-based exchanges does not provide the necessary information to support investigations directed toward discovering component characteristic data influences on product returns. A need therefore exists for a system and method for compiling and accessing component characteristic data in an Internet-based exchange environment such that meaningful analysis can be conducted to discover patterns that may influence product returns. Further, since different manufacturers may employ different methods and bases for measuring and reporting their component characteristic data, a meaningful analysis would be greatly facilitated by uniformly presenting the each manufacturer's component characteristic data in accordance with a preselected standard.

SUMMARY OF THE INVENTION

The present invention is directed to a quality exchange system providing the capability to communicate characteristic data, including quality information, to manufacturers and/or consumers. Through the use of the present invention, manufacturers and/or consumers may be able to receive characteristic data that has been standardized in accordance with a data standard. The present invention thereby provides the advantages of providing manufacturers with a common forum for sharing characteristic data, offering consumers a convenient mechanism for providing manufacturers with valuable feedback about their components, and facilitating meaningful analyses of each manufacturer's component characteristic data.

A quality exchange system in accordance with the present invention may comprise a receiving system, a converter, and an extractor. The receiving system is adapted for receiving characteristic data, as well as characteristic data requirements, for a plurality of components from at least one buyer processor and/or at least one seller processor. The characteristic data comprises any information, including quality information, that relates to decreasing the return rate for the plurality of components and/or to increasing the quality and/or reliability of the plurality of components. Similarly, the characteristic data requirements include a request by one or more of the seller processors and/or the buyer processors for standardized characteristic data from the quality exchange system.

The converter is coupled with, and capable of data communications with, the receiving system and is capable of establishing a data standard. Since the characteristic data may be measured and reported based upon a plurality of different methods and bases, the data standard provides a uniform standard into which the characteristic data can be converted to facilitate meaningful characteristic data analyses. For each of the plurality of components, the converter generates the data standard by examining the characteristic data as reported by the seller processors along with any comments included in the characteristic data from the buyer processors. If multiple data standards would facilitate meaningful alternate analyses of the characteristic data, the converter may be capable of generating a plurality of data standards for each of the plurality of components. One of the plurality of data standards may be designated as a default data standard.

After the data standard has been established, the converter is capable of converting subsequent characteristic data from the seller processors and/or the buyer processors into standardized characteristic data in accordance with the data standard. Upon receiving characteristic data from the receiving system, the converter first verifies that the characteristic data substantially complies with a set of data format requirements. If the characteristic data is acceptable, the converter then converts the characteristic data into the standardized characteristic data, storing the standardized characteristic data in a database system. To encourage the seller processors to provide characteristic data that substantially complies with the set of data format requirements, the quality exchange system may condition the participation of each seller processor upon providing acceptable characteristic data.

The converter also is capable of receiving the characteristic data requirements from the seller processors and/or the buyer processors via the receiving system. The converter, upon receipting the characteristic data requirements for one or more of the plurality of components, retrieves any standardized characteristic data relevant to the characteristic data requirements from the database system. If the characteristic data requirements include one or more preselected data standards for presenting the standardized characteristic data, the converter may convert the relevant characteristic data to substantially comply with the preselected data standards. After the standardized characteristic data has been retrieved and, if necessary, converted, the converter communicates the relevant standardized characteristic data to the extractor. The extractor is coupled with, and capable of data communications with, the receiving system and/or the converter and is capable of presenting the standardized characteristic data to the seller processors and/or the buyer processors.

It will be appreciated that a quality exchange system in accordance with the present invention may permit manufacturers and/or customers to exchange characteristic data, including quality information, for a plurality of components, facilitating meaningful analyses of each manufacturer's characteristic data.

BRIEF DESCRIPTION OF THE DRAWINGS

FIGS. 3A–C and 4A–B each are flow diagrams illustrating the steps in a method performed in the system of FIG. 1.

DETAILED DESCRIPTION OF PREFERRED EMBODIMENTS

Figure 1:
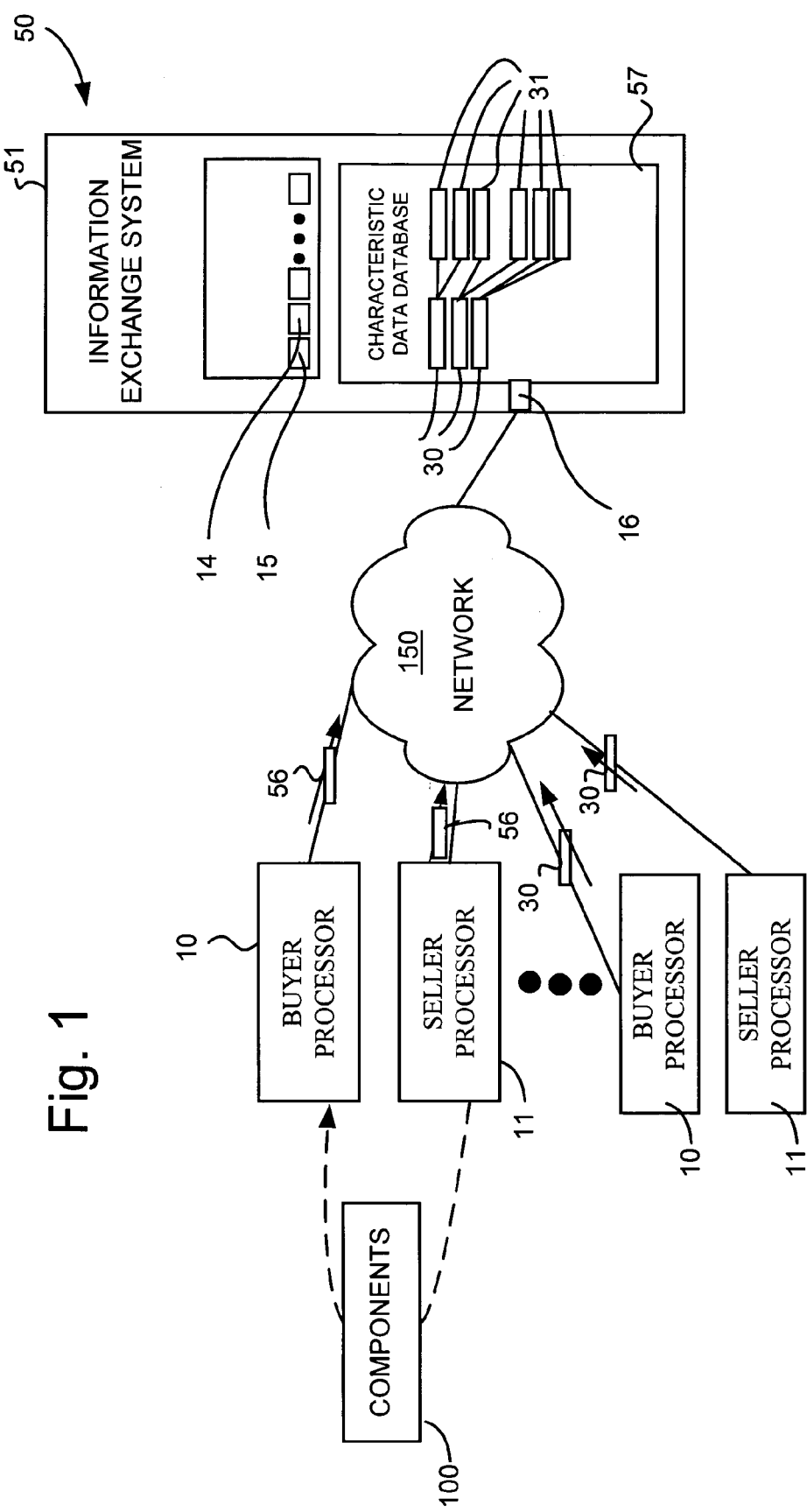
FIG. 1 is a block diagram illustrating a system for information exchange in a component exchange system.

Since quality information for substantially similar components may be difficult to evaluate due to a lack of availability or inconsistent measurement standards, a quality exchange system in a component exchange system may prove to be a convenient and meaningful approach for presenting quality information. By making quality information more uniform and more readily available, knowledge may expand concerning interactions among various components, resulting in an increase in quality and a decrease in a number of returns. This result may be achieved, according to one embodiment of the present invention, by employing a quality exchange system 51 in a component exchange system 50 as shown in FIG. 1. The quality exchange system 51 may include a receiving system 16 for receiving characteristic data 30, a converter 14 for establishing a data standard and for converting the characteristic data 30 into standardized characteristic data 31, and an extractor 15 for presenting the standardized characteristic data 31. The quality exchange system 51 may be implemented in a computer component exchange system 50, such as that described in application Ser. No. 09/557,040, entitled INTERNET BASED COMPUTER SYSTEM COMPONENT EXCHANGE, filed Apr. 21, 2000, the entire contents of which are incorporated herein by reference.

The receiving system 16 preferably is coupled with, and capable of data communications with, at least one buyer processor 10 and/or at least one seller processor 11 via, for example, an information network 150. The buyer processors 10 and/or the seller processors 11 each may comprise any form of processor such as a PLD, a DSP, and/or a personal computer. The information network 150 may comprise, for example, a local area network, a wide area network, the Internet, or any other type of information network. The receiving system 16, each of the buyer processors 10, and/or each of the seller processors 11 may communicate with the information network 150 via any media form such as telephone, Ethernet, wireless, fiberoptic, T1, ISDN, xDSL, and/or any Internet Protocol (IP) capable media. The receiving system 16, the buyer processors 10, and/or the seller processors 11 each preferably communicate in real-time with the information network 150 in an XML environment.

The communications among the receiving system 16, each of the buyer processors 10, and/or each of the seller processors 11 may comprise non-encrypted and/or encrypted communications.

Each of the seller processors 11 and/or buyer processors 10 may be adaptable for communicating characteristic data 30 regarding a plurality of components 100 to the receiving system 16. The characteristic data 30 comprises any information, including quality information, that relates to decreasing the return rate for the plurality of components 100 and/or to increasing the quality and/or reliability of the plurality of components 100. For example, regarding each component manufactured by one of the seller processors 11, the seller processor 11 may communicate any known reliability information, such as mean time between failures, to the component exchange system 50. Similarly, one of the buyer processors 10 may report a component failure to the component exchange system 50 after the component, manufactured by one of the seller processors 11, failed while being used in combination with certain other components. The buyer processors 10 and/or the seller processors 11 each may include one or more input devices and/or systems, such as a keyboard, a disk drive, and/or a scanner, for entering the characteristic data 30 into the buyer processors 10 and/or the seller processors 11.

The converter 14 is coupled with, and capable of data communications with, the receiving system 16, and receives the characteristic data 30 from the receiving system 16. To facilitate a meaningful analysis of the characteristic data 30, the converter 14 preferably also is capable of establishing the data standard, a uniform standard into which the characteristic data 30 for each of the plurality of components 100 can be converted. Being generated by one or more of the seller processors 11 and/or one or more of the buyer processors 10, the characteristic data 30, as received by the receiving system 16, may be measured and reported based upon a plurality of different methods and bases. Stated somewhat differently, each seller processor 11 and/or each buyer processor 10 may utilize its own measurement procedures and standards, which differ from the measurement procedures and standards used by other seller processors 11 and/or buyer processors 10.

For example, seller processors 11 who manufacture computer hard disks may report a "seek time" for each of their hard disk models. For each hard disk model, the seek time, as reported, may comprise a measured value, such as track-to-track seek time or full-stroke seek time, or a calculated value, such as an average seek time. The calculated value may be based upon any number of measured values, depending on the underlying measurement procedure used by each seller processor 11. As the number of the measured values increases and/or a testing pattern grows more diverse, the calculated value is more likely to accurately reflect the actual performance of the disk drive model. Each underlying measurement procedure therefore may yield a different seek time for the same hard disk model.

For each of the plurality of components 100, the converter 14 generates the data standard by examining the characteristic data 30 as reported by the seller processors 11 along with any comments included in the characteristic data 30 from the buyer processors 10. Since each of the seller processors 11 may employ different underlying measurement procedures, the converter 14 seeks characteristic data 30 comprising measured, rather than calculated, values from the seller processors 11. The converter 14 also may establish uniform measuring procedures to the seller processors 11 and/or the buyer processors 10 for determining the measured values. From the measured values, the converter 14 evaluates factors, such as sample size and/or data trends, and/or generates uniform standardized characteristic data 31 for each of the plurality of components 100. When generating the data standard, the converter 14 also may consider the characteristic data 30 communicated by the buyer processors 10, which provides a valuable system for receiving consumer feedback regarding the plurality of components 100. If multiple data standards would facilitate meaningful alternate analyses of the characteristic data 30, the converter 14 may be capable of generating a plurality of data standards for each of the plurality of components 100. One of the plurality of data standards may be designated as a default data standard.

Figure 2:
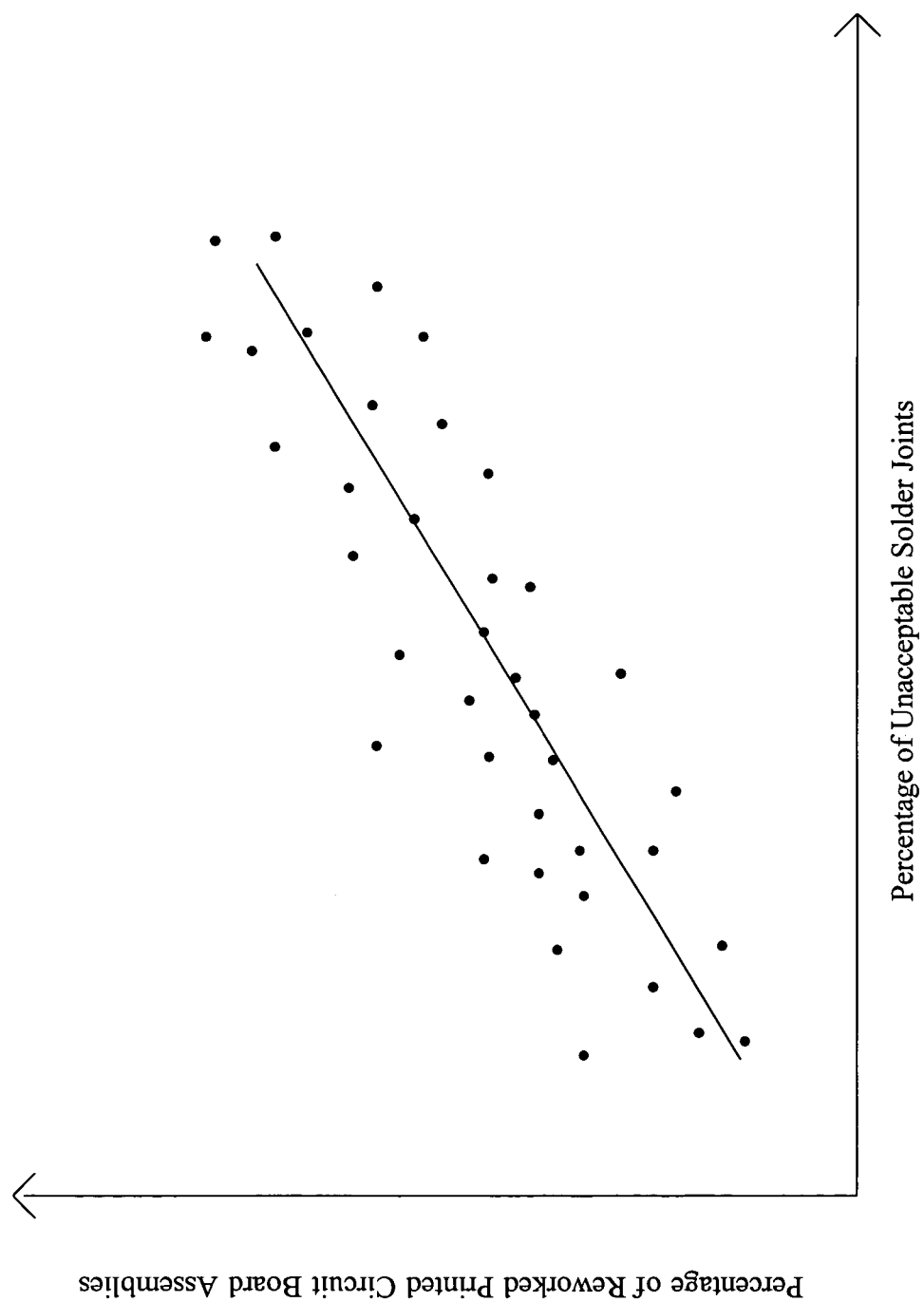
FIG. 2 is an exemplary graph illustrating a linear regression for unacceptable solder joints.

For example, one of the seller processors 11 who manufactures printed circuit board assemblies may report a ninety-nine percent pass rate on its solder connections. The reported pass rate however may be based upon a sample size of ten assemblies or ten million assemblies. Further, the pass rate, as reported, may reflect a single unacceptable solder joint repeated on each of the tested assemblies or one assembly comprising only unacceptable solder joints for every ninety-nine assemblies that pass continuity testing. The converter 14 may base the standardized characteristic data 31 for the printed circuit board assemblies on a number of assemblies which are reworked per comments from the buyer processors 10; whereas, the quality information from a particular manufacturer may comprise percentage measurements for unacceptable solder joints out of a total number of solder joints attempted. The standard may have been selected, for example, because reworking the unacceptable assemblies may have an adverse effect on subsequent performance. With reference to FIG. 2, the converter 14 may perform a linear regression, regressing the percentage of unacceptable solder joints provided by the manufacturer against the percentage of reworks typically found given such percentage of unacceptable solder joints. An exemplary graph of such a linear regression is shown in FIG. 2.

Returning to FIG. 1, the converter 14 may receive characteristic data 30 from the seller processors 11 and/or the buyer processors 10 via the receiving system 16 after the data standard has been established. The converter 14 also is capable of converting the characteristic data 30 into standardized characteristic data 31 in accordance with the data standard, preferably the default data standard. Upon receiving the characteristic data 30, the converter 14 verifies that the characteristic data 30 substantially complies with a set of data format requirements, also established by the converter 14. Examples of such data format requirements include, without limitation: data field length, transmission header format, or other non-substantive criteria for accepting characteristic data 30. If the characteristic data 30 does not substantially comply with the set of data format requirements, the converter 14 may be capable of rejecting the characteristic data 30, notifying the receiving system 16 of the substantial non-compliance, and/or accepting the characteristic data 30 despite the substantial non-compliance. Upon receiving notification of the substantial non-compliance, the receiving system 16 may be adapted to prompt the seller processor 11 and/or the buyer processor 10 for acceptable characteristic data 30 and/or may be capable of converting the non-compliant characteristic data 30 into characteristic data 30 that sufficiently complies with the data standard. To encourage each of the seller processors 11 to report characteristic data 30 that substantially complies with the set of data format requirements, the participation of each seller processor 11 in the quality exchange system 51 may be conditioned upon providing a substantially compliant characteristic data format. As the characteristic data 30 is received, the converter 14 may be capable of modifying the data standard in accordance with the additional characteristic data 30.

The converter 14 preferably includes a database system 57 for retaining the standardized characteristic data 31 and/or the data standard. The database system 57 may include any form of searchable database and preferably comprises a memory system. The memory system of the converter 14 may include any form of electronic and/or magnetic storage medium, such as, for example, SRAM, DRAM, EEPROM, FLASH, a hard drive, a compact disk, or any other form of storage medium. The memory system preferably comprises non-volatile memory. Preferably, the standardized characteristic data 31 stored within the database system 57 substantially complies with the default data standard.

The receiving system 16 further may be adapted for receiving characteristic data requirements 56 from one or more of the buyer processors 10 and/or one or more of the seller processors 11 and for communicating characteristic data requirements 56 to the converter 14 via the receiving system 16. The characteristic data requirements 56 each preferably comprise a request for the characteristic data 30, such as component quality information, regarding one or more of the plurality of components 100 that are supported by the information exchange system 51. The characteristic data requirements 56 are generated by the buyer processors 10 and/or the seller processors 11 and may be communicated to the buyer processors 10 and/or the seller processors 11 by one or more of the input devices and/or systems. Upon receipt, the converter 14 may be capable of searching the database system 57 for standardized characteristic data 31 relevant to each of the components included in the characteristic data requirements 56. If relevant standardized characteristic data 31 is available, the converter 14 retrieves the relevant standardized characteristic data 31 from the database system 57.

Since more than one data standard may be associated with the components included in the characteristic data requirements 56, the characteristic data requirements 56 also may include a preselected data standard, whereby the seller processor 11 and/or the buyer processor 10 may select the data standard. The default data standard preferably is applied when the characteristic data requirements 56 do not include the preselected data standard. For example, if the characteristic data 30 is based upon distance, the data standard may provide conversions of the distance into feet, inches, microns, meters, centimeters, millimeters, and/or any other relevant units, with the centimeters conversion serving as the default data standard. If necessary, the converter 14 preferably is capable of converting the relevant standardized characteristic data 31 as stored in the database system 57 into relevant standardized characteristic data 31 that is substantially in compliance with the preselected data standard. The converter 14 then communicates the relevant standardized characteristic data 31 to the extractor 15.

The extractor 15 is coupled with, and capable of data communications with, the receiving system 16 and/or the converter 14. Upon receipt of the relevant standardized characteristic data 31, the extractor 15 presents the relevant standardized characteristic data 31 to the requesting seller processors 11 and/or buyer processors 10. The requesting seller processors 11 and/or buyer processors 10 each may include one or more output devices and/or systems, such as a display or a printer, for presenting the characteristic data 30. The extractor 15 preferably is coupled with, and capable of data communications with, at least one of the buyer processors 10 and/or at least one of the seller processors 11 via, for example, the information network 150. The extractor 15, each of the buyer processors 10, and/or each of the seller processors 11 may communicate with the information network 150 via any media form such as telephone, Ethernet, wireless, fiberoptic, T1, ISDN, xDSL, and/or any Internet Protocol (IP) capable media. The extractor 15, the buyer processors 10, and/or the seller processors 11 each may communicate in real-time with the information network 150 in an XML environment. The communications among the extractor 15, each of the buyer processors 10, and/or each of the seller processors 11 may comprise non-encrypted and/or encrypted communications. The extractor 15 also may be adapted to present all of the standardized characteristic data associated with at least one preselected component among the plurality of components and/or all of the standardized characteristic data associated with a preselected seller processor.

Figure 3A:
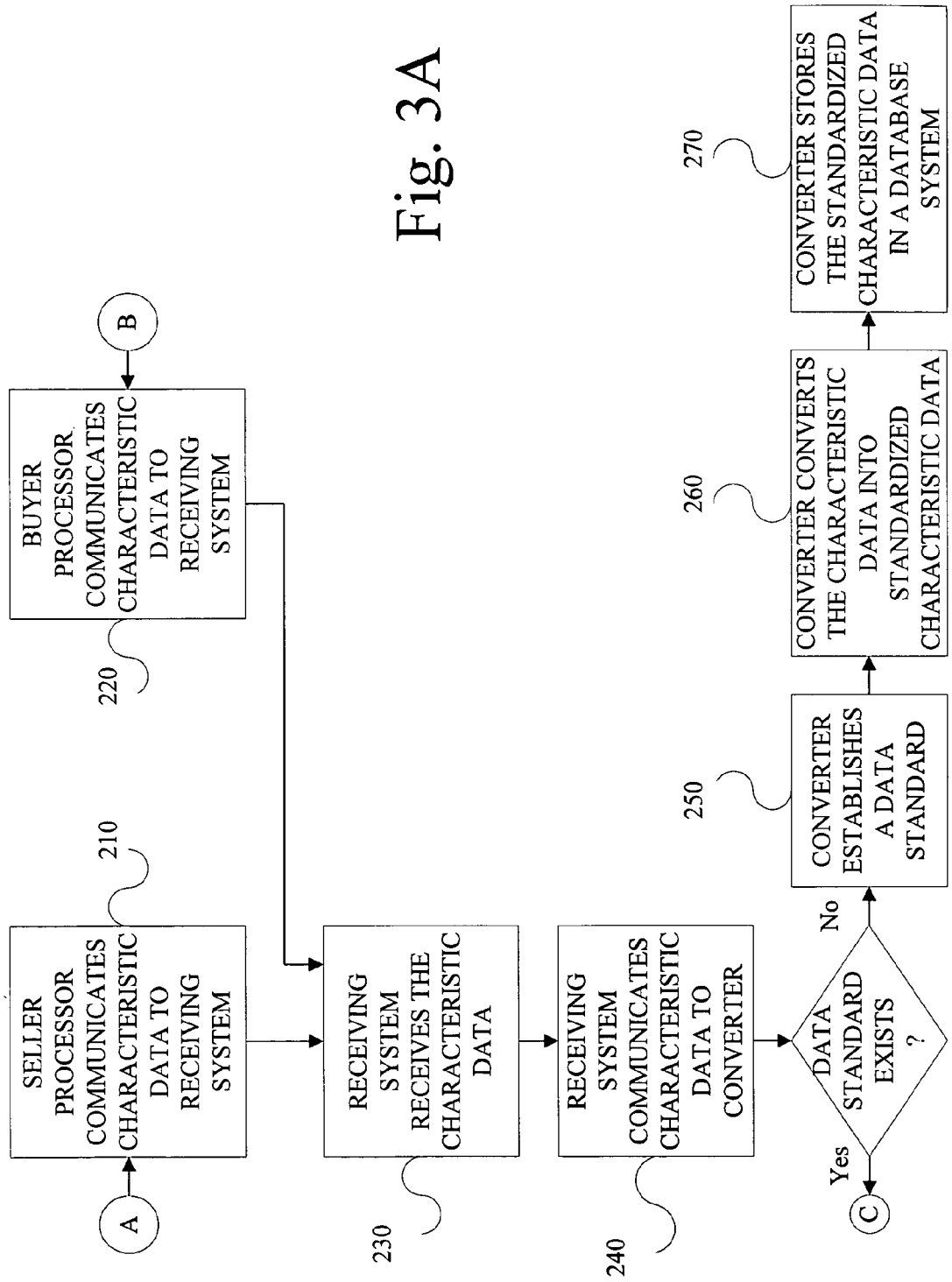
Figure 3C:
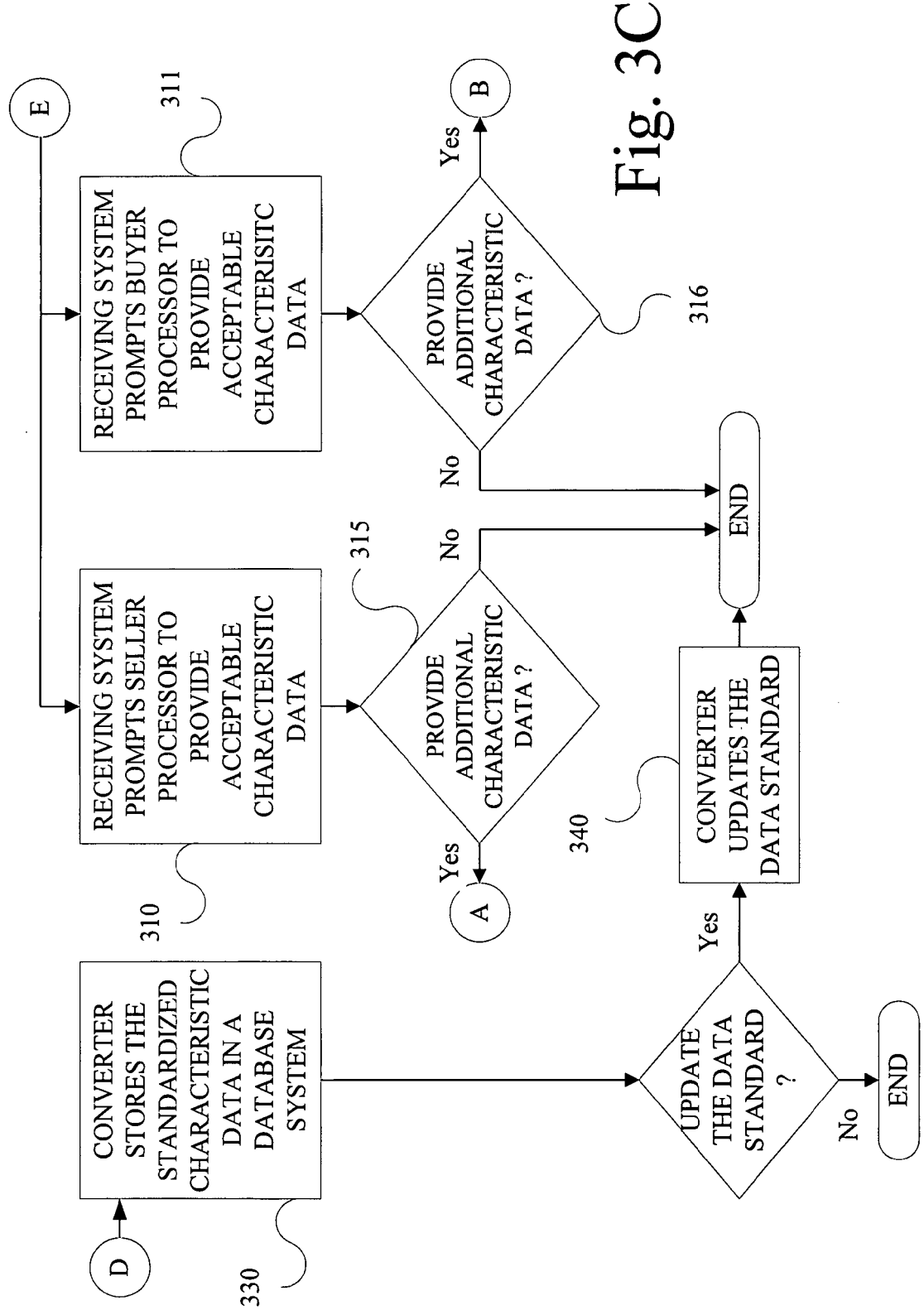

Turning to FIGS. 3A–C, one or more seller processors 11 [STEP 210] and/or one or more buyer processors 10 [STEP 220] each, in operation, may communicate characteristic data 30, including quality information, regarding a plurality of components 100 to a receiving system 16 of an information exchange system 51. Each of the seller processors 11 and/or each of the buyer processors 10 may communicate with the receiving system 16 via, for example, an information network 150 through non-encrypted and/or encrypted communications. Upon receiving the characteristic data 30 [STEP 230], the receiving system 16 preferably communicates the characteristic data 30 to a converter 14 of the information exchange system 51 [STEP 240].

By examining the characteristic data 30 as provided by the seller processors 11 and/or the buyer processors 10 via the receiving system 16, the converter 14 establishes a data standard for the plurality of components 100 [STEP 250]. The data standard preferably comprises a uniform standard into which the characteristic data 30 for each of the plurality of components 100 can be converted. To establish the data standard, the converter 14 preferably evaluates factors, such as sample size and/or data trends. If multiple data standards would facilitate meaningful alternate analyses of the characteristic data, the converter 14 may generate a plurality of data standards for each of the plurality of components 100 and designate one of the plurality of data standards to be a default data standard. As part of the data standard, the converter 14 also may establish uniform measuring procedures and/or a set of data format requirements for the seller processors 11 and/or the buyer processors 10. The uniform measuring procedures may be used to create subsequent characteristic data 30; whereas, the set of data format requirements provide one or more non-substantive criteria for accepting characteristic data 30. Once the data standard has been established, the converter 14 may convert the characteristic data 30 into standardized characteristic data 31 substantially in accordance with the data standard, preferably the default data standard [STEP 260]. The converter 14 then stores the standardized characteristic data 31 in a database system 57 [STEP 270].

The converter 14, once the data standard has been established, may subsequently receive characteristic data 30 from the seller processors 11 and/or the buyer processors 10 via the receiving system 16 [STEP 240]. Upon receiving the subsequent characteristic data 30, the converter 14 first verifies that the subsequent characteristic data 30 substantially complies with the set of data format requirements [STEP 280]. If the subsequent characteristic data 30 does not substantially comply with the data format requirements, the converter 14 may reject the subsequent characteristic data 30 [STEP 290] and notify the receiving system 16 of the substantial non-compliance [STEP 295], and/or the converter 14 accept the subsequent characteristic data 30 despite the substantial non-compliance [STEP 300]. Upon receiving notification of the substantial non-compliance, the receiving system 16 also may prompt the seller processor 11 [STEP 310] and/or the buyer processor 10 [STEP 311] to provide acceptable characteristic data 30. The seller processor 11 [STEP 315] and/or the buyer processor 10 [STEP 316] may elect to communicate additional characteristic data 30 to the receiving system 16 in response to the prompt. Once found to be acceptable by the converter 14, the subsequent characteristic data 30 is converted into standardized characteristic data 31 in accordance with the data standard [STEP 320], preferably the default data standard, and stored in the database system 57 for later access and/or retrieval [STEP 330]. As the subsequent characteristic data 30 is received, the converter 14 may modify and/or update the data standard in accordance with the subsequent characteristic data 30 [STEP 340].

Figure 4A:
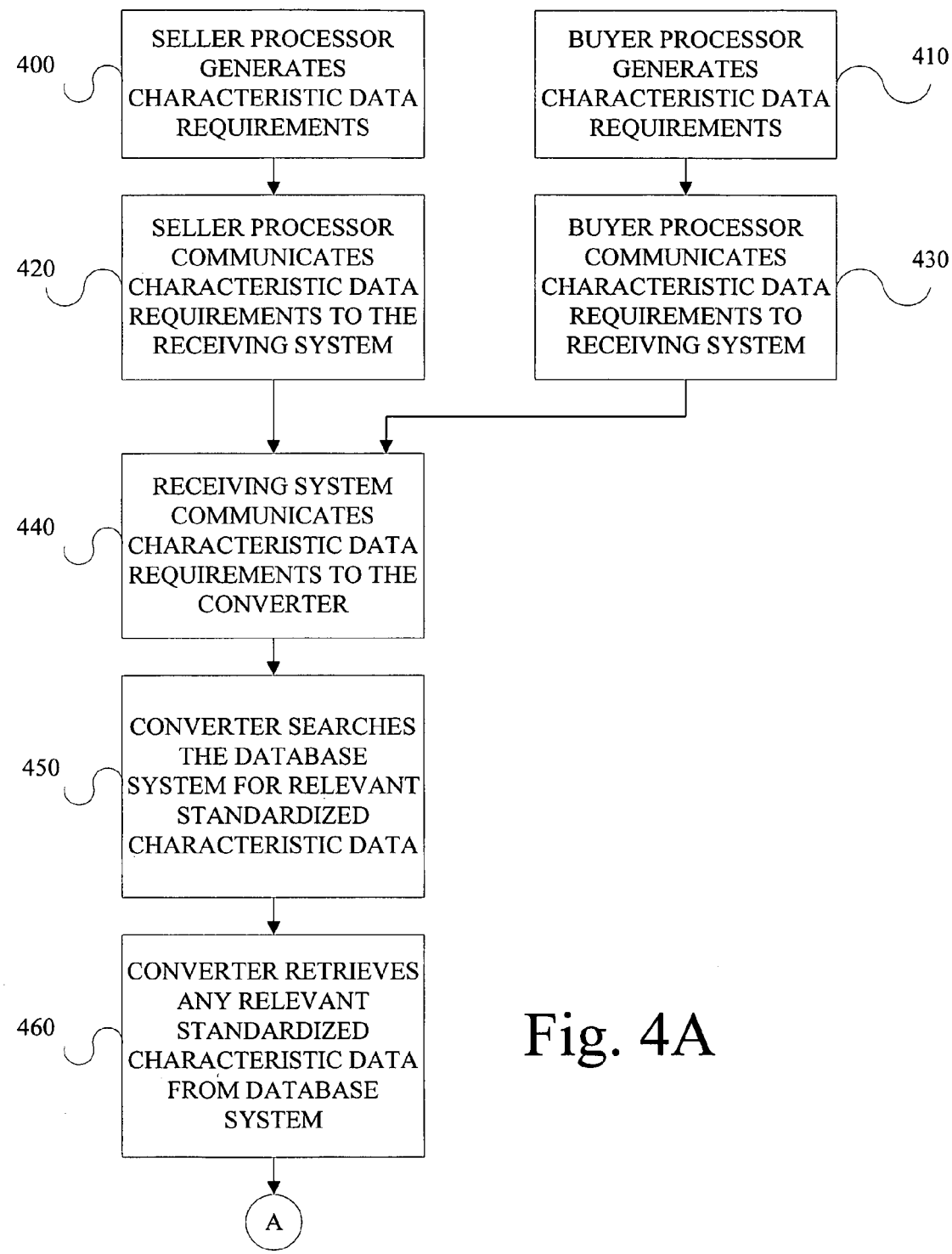
Figure 4B:
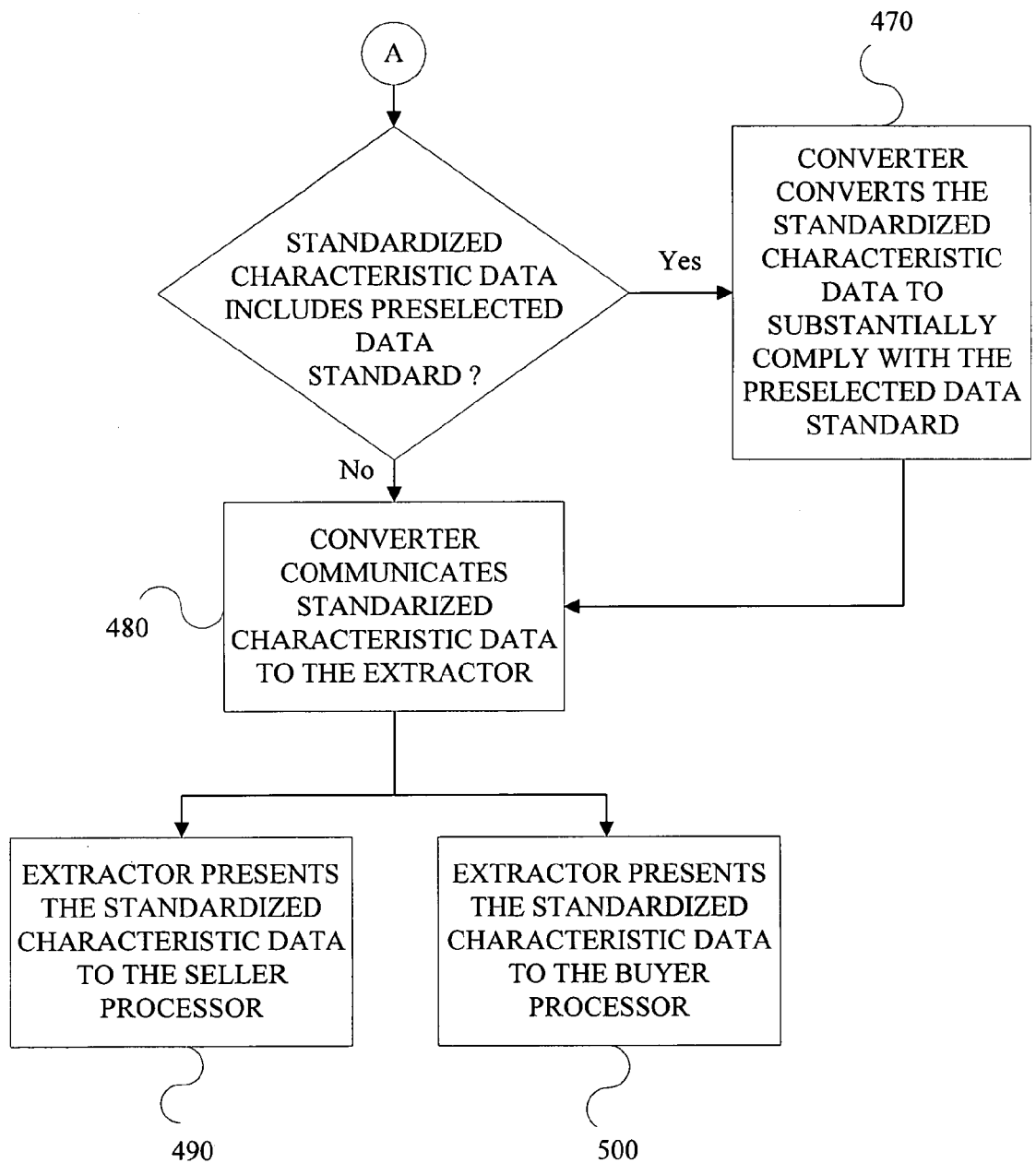

As shown in FIGS. 4A–B, the seller processors 11 [STEP 400] and/or the buyer processors [STEP 410] further may generate characteristic data requirements 56. The characteristic data requirements 56 each preferably comprise a request for the characteristic data 30, such as component quality information, regarding one or more of the plurality of components 100 supported by the information exchange system 51. The seller processors 11 [STEP 420] and/or the buyer processors 10 [STEP 430] preferably communicate the characteristic data requirements 56 to the receiving system 16, which may, in turn, communicate the characteristic data requirements 56 to the converter 14 [STEP 440]. Upon receipt of the characteristic data requirements 56, the converter 14 may search the database system 57 for standardized characteristic data 31 that is relevant to each of the components included in the characteristic data requirements 56 [STEP 450]. If relevant standardized characteristic data 31 is available, the converter 14 retrieves the relevant standardized characteristic data 31 from the database system 57 [STEP 460].

Since more than one data standard may be associated with the components included in the characteristic data requirements 56, the seller processors 11 and/or the buyer processors 10 may include a preselected data standard in the characteristic data requirements 56. By including the preselected data standard in the characteristic data requirements 56, the seller processor 11 and/or the buyer processor 10 may designate and/or select an appropriate and/or desired data standard. If the characteristic data requirements 56 do not include the preselected data standard, the converter 14 applies the default data standard. The converter 14 then, if necessary, converts the relevant standardized characteristic data 31 as provided by the database system 57 into relevant standardized characteristic data 31 that is substantially in compliance with the preselected data standard [STEP 470].

After the conversion, the converter 14 communicates the relevant standardized characteristic data 31 to an extractor 15 of the information exchange system 51 [STEP 480]. Upon receiving the relevant standardized characteristic data 31, the extractor 15 presents the relevant standardized characteristic data 31 to the requesting seller processors 11 [STEP 490] and/or buyer processors 10 via, for example, the information network 150 [STEP 500]. Upon request by the seller processor 11 and/or buyer processor 10, the extractor 15 also may present all of the standardized characteristic data 31 associated with at least one preselected component [STEP 510] and/or all of the standardized characteristic data associated with a preselected seller processor [STEP 520].

While the invention is susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. A system for information exchange in a component exchange system, the component exchange system being capable of data communications with at least one seller processor and at least one buyer processor, the at least one seller processor being adaptable for communicating characteristic data regarding a plurality of components to the component exchange system, and the at least one buyer processor being adaptable for receiving the characteristic data from the component exchange system, comprising:

a receiving system for receiving the characteristic data, from at least one of the at least one seller processor;

a converter for receiving the characteristic data from said receiving system, examining said characteristic data and generating a data standard for the characteristic data therefrom, and converting the characteristic data into standardized characteristic data in accordance with the data standard; and an extractor for presenting the standardized characteristic data to at least one of the at least one buyer processor.

2. The system of claim 1, wherein the receiving system is capable of receiving the characteristic data from at least one of the at least one buyer processor.

3. The system of claim 1, wherein the converter is capable of establishing a set of data format requirements and is capable of verifying that the characteristic data sufficiently complies with the set of data format requirements.

4. The system of claim 3, wherein the receiving system is capable of converting each of the characteristic data that does not sufficiently comply with the data standard.

5. The system of claim 1, wherein the data standard comprises a measurement standard for the characteristic data.

6. The system of claim 1, wherein the data standard is selectable.

7. The system of claim 1, wherein the extractor is capable of presenting the standardized characteristic data to at least one of the at least one seller processor.

8. The system of claim 1, wherein the extractor is capable of presenting all of the standardized characteristic data associated with at least one preselected component.

9. The system of claim 1, wherein the extractor is capable of presenting all of the standardized characteristic data associated with a preselected seller processor.

10. A system for information exchange in a component exchange system, the component exchange system being capable of data communications with at least one seller processor and at least one buyer processor, the at least one seller processor being adaptable for communicating characteristic data regarding a plurality of components to the component exchange system, and the at least one buyer processor being adaptable for receiving the characteristic data from the component exchange system, comprising:

a receiving system for receiving the characteristic data from at least one of the at least one buyer processor;

a converter for receiving the characteristic data from said receiving system, examining said characteristic data and generating a data standard for the characteristic data therefrom, and converting the characteristic data into standardized characteristic data in accordance with the data standard, the converter being capable of verifying that the characteristic data sufficiently complies with a set of data format requirements, said data standard comprising a measurement standard for presenting the characteristic data and being selectable; and an extractor for presenting the standardized characteristic data to at least one of the at least one buyer processor.

11. A method for exchanging information in a component exchange system, the component exchange system being capable of data communications with at least one seller processor and at least one buyer processor, the at least one seller processor being adaptable for communicating characteristic data regarding a plurality of components to the component exchange system, and the at least one buyer processor being adaptable for receiving the characteristic data from the component exchange system, comprising the steps of;

examining said characteristic data and generating a data standard for the characteristic data therefrom;

receiving the characteristic data from at least one of the at least one seller processor; converting the characteristic data into standardized characteristic data in accordance with the data standard; and presenting the standardized characteristic data to at least one of the at least one buyer processor.

12. The method of claim 11, further comprising the step of verifying that the characteristic data sufficiently complies with a set of data format requirements.

13. The method of claim 11, further comprising the step of converting each of the characteristic data that does not sufficiently comply with the data standard into the standardized characteristic data.

14. The method of claim 11, further comprising the step of providing a measurement standard for generating the characteristic data.

15. The method of claim 11, further comprising the step of selecting a data standard.

16. The method of claim 11, further comprising the step of presenting all of the standardized characteristic data associated with at least one preselected component.

17. The method of claim 11, further comprising the step of presenting all of the standardized characteristic data associated with a preselected seller processor.

18. A method for exchanging information in a component exchange system, the component exchange system being capable of data communications with at least one seller processor and at least one buyer processor, the at least one seller processor being adaptable for communicating characteristic data regarding a plurality of components to the component exchange system, and the at least one buyer processor being adaptable for receiving the characteristic data from the component exchange system, comprising the steps of;

examining said characteristic data and generating a data standard for the characteristic data therefrom;

receiving the characteristic data from at least one of the at least one buyer processor and at least one of the at least one seller processor;

verifying that the characteristic data sufficiently complies with the data standard;

converting the characteristic data into standardized characteristic data in accordance with the data standard, said data standard comprising a measurement standard for presenting the characteristic data and being selectable; and presenting the standardized characteristic data to at least one of the at least one buyer processor and at least one of the at least one seller processor.

* * * * *